(12) United States Patent
Bae et al.

(10) Patent No.: US 6,256,045 B1
(45) Date of Patent: Jul. 3, 2001

(54) DEVICE AND METHOD FOR PROCESSING PICTURE IN MPEG DECODER

(75) Inventors: Sung Ok Bae, Kyungki-do; Seong Jae Min, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/026,164

(22) Filed: Feb. 19, 1998

(30) Foreign Application Priority Data

Feb. 22, 1997 (KR) .................................................. 97/5419

(51) Int. Cl.$^7$ .................................... H04N 7/01; H04N 5/46
(52) U.S. Cl. ................................................ 345/445; 348/556
(58) Field of Search .............................. 348/392, 423, 348/424, 441, 443, 445, 446, 458, 459, 556, 553, 554, 555, 913; 345/508, 509; 382/233, 239; H04N 5/46, 7/01, 11/20

(56) References Cited

U.S. PATENT DOCUMENTS

| | | | |
|---|---|---|---|
| 5,530,484 | * 6/1996 | Bhatt et al. | 348/556 |
| 5,689,436 | * 11/1997 | Takeuchi | 364/514 A |
| 5,691,768 | * 11/1997 | Civanlar et al. | 348/423 |
| 5,757,967 | * 5/1998 | Gonzales et al. | 382/233 |
| 5,818,512 | * 10/1998 | Fuller | 348/584 |
| 5,838,336 | * 11/1998 | Ross | 348/508 |
| 5,867,219 | * 2/1999 | Kohiyama | 348/400 |
| 5,903,310 | * 4/1999 | Finotello et al. | 348/391 |

* cited by examiner

Primary Examiner—Michael H. Lee
(74) Attorney, Agent, or Firm—Fleshner & Kim, LLP (57) ABSTRACT

Device and method for processing a picture in an MPEG decoder, is disclosed, which can reduce an amount of data to be stored in a memory, particularly, of the video format conversions carried out in the image presenting part, by processing the video format conversion requiring a data reduction such as the letter box processing during a video decoding process by the video decoder in advance, reducing amounts of data transmissions between the video decoder and the external memory and between the external memory and the image presenting part, the present invention can reduce not only an external memory size, but also a memory bandwidth, whereby improving an efficiency of use of the memory, and, on top of the fact that a memory size reduction lowers cost, the memory bandwidth reduction can further lower cost because a slower clock can be used.

15 Claims, 6 Drawing Sheets

DEVICE AND METHOD FOR PROCESSING PICTURE IN MPEG DECODER

BACKGROUND OF THE INVENTION

1. Field of the Invention

The present invention relates to a picture decoding, and more particularly, to device and method for processing a picture in an MPEG decoder which can reduce an amount of data to be stored in a memory.

2. Discussion of the Related Art

The techniques of video compression and multiplexing in the Grand Alliance system, which is the HDTV (High Definition TV) system of the U.S., follow the MPEG (Moving Picture Experts Group)-2 standards as they are. The standards for video format do not restrict to one video format, but allows different video formats in encoding and decoding. For example, there are a format with a 60 Hz field rate for a video source of 1080(V)* 1920(H) interlace scanning and formats with 24 Hz and 30 Hz frame rates for a video source of 720(V)* 1280(H) progressive scanning in the HDTV class, and there are formats with 24 Hz, 30 Hz and 60 Hz frame rates for a video source of 480(V)*720(H) interlace scanning and formats with 24 Hz, 30 Hz and 60 Hz frame rates for a video source of 480(V)*640(H) progressive scanning in the SDTV (NTSC) class. The HDTV class has an aspect ratio of 16:9 and the SDTV class have an aspect ratio of 16:9 or 4:3. Thus, though there are different video formats possible to receive, video formats possible to be displayed on a monitor, such as a TV receiver, will be in general limited to one or two to be consistent to the monitor feature, despite such a monitor can receive and display any video formats. Further, even if the HDTV broadcasting is started, since it is foreseen that the HDTV broadcasting and current NTSC or SDTV broadcasting coexist for a substantial period of time, it is required that they have to have an interchangeability. That is, if a monitor has a display standard of an SD class while a video source has an HD class, a video format conversion from the HD class to the SD class will be required. Similarly, a video format conversion of a video with an aspect ratio of 16:9 for display on a monitor with an aspect ratio of 4:3 will also be required, and vice versa. Thus, if a display format, i.e., a display size and a video source size are different from each other, a video format conversion is required.

Figure 1:
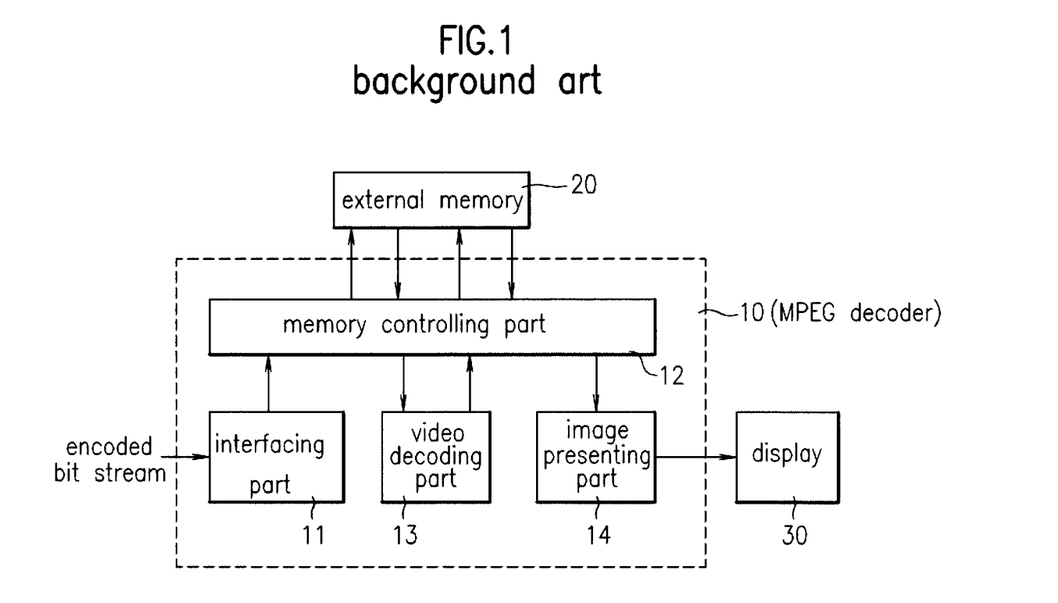
FIG. 1 illustrates a block diagram of a system of a background art MPEG decoder.

A system of a background art MPEG decoder for conducting this is illustrated in FIG. 1, wherein the MPEG decoder 10 in general uses an external memory 20 provided with a buffer for temporary storage of a bit stream and a frame memory. The MPEG decoder 10 is provided with an interfacing part 11 for interfacing an encoded bit stream with the external memory 20, a memory controlling part 12 for controlling data input/output from/to the external memory 20 and the MPEG decoder 10, a video decoder 13 for decoding the bit stream stored in the external memory 20 and storing decoded pixel data in the external memory 20, and a video presenting part 14 for processing a signal of the pixel data stored in the external memory such that the pixel data is displayable on a display 30 and converting a format of a video source if formats of the video source and the display 30 are different from each other.

Figure 2:
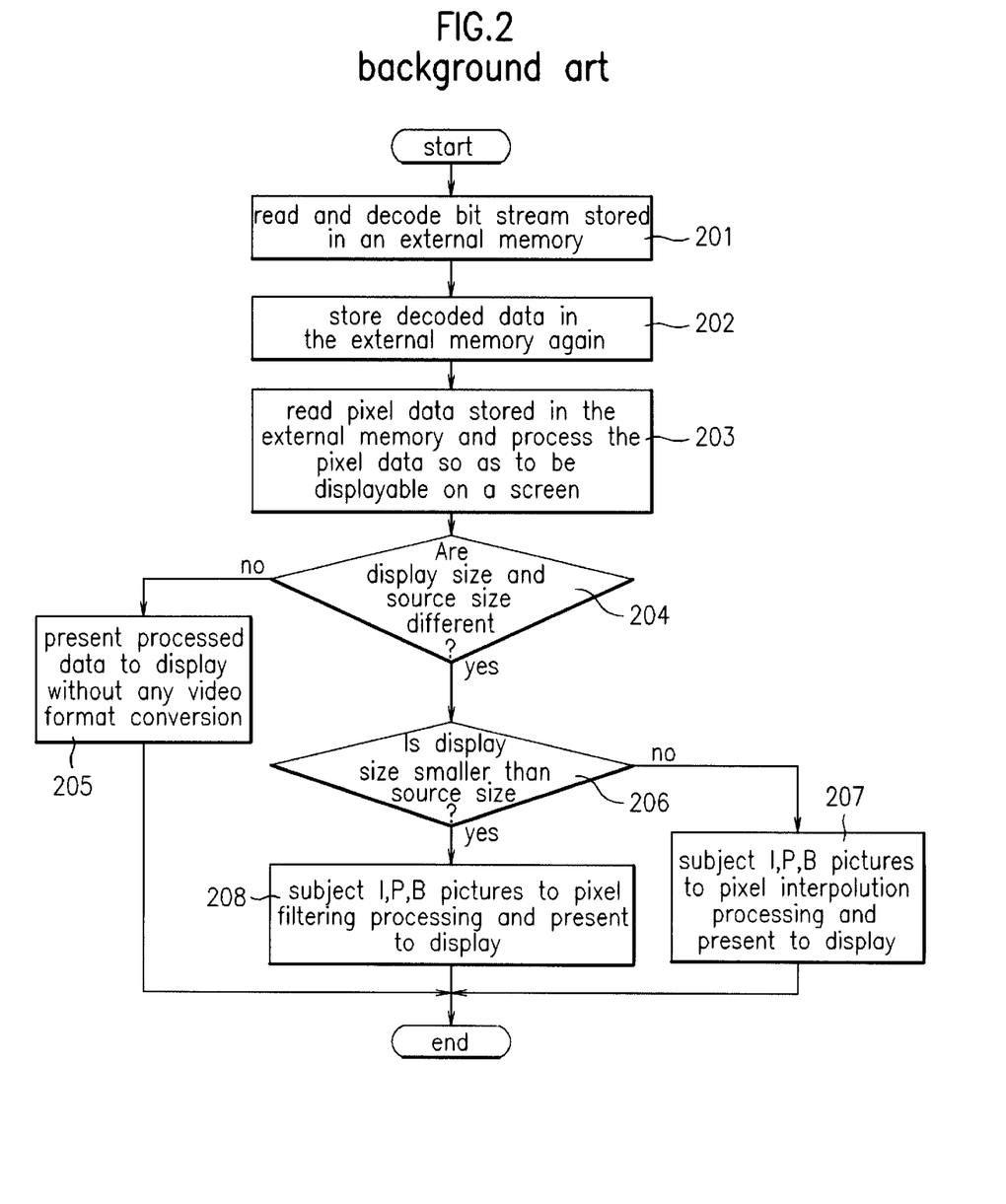
FIG. 2 illustrates an operation flow chart showing a method for processing a picture in the MPEG decoder shown in FIG. 1.

FIG. 2 illustrates an operation flow chart of the MPEG decoder 10 shown in FIG. 1.

Referring to FIGS. 1 and 2, when an encoded bit stream is transmitted and received at the MPEG decoder 10, the bit stream is stored in the external memory 20 through the interfacing part 11. Then, the video decoding part 13 reads the bit stream from the external memory, decodes (step 201), and stores the bit stream in the external memory 20, again (step 202). That is, the video decoding part 13 removes overheads (various header information, start codes and etc.) from the received bit stream and conducts a VLD (Variable Length Decoding) of pure data information to restore the bit stream into pixels of an original image through an inverse quantizing process, inverse discrete cosine transformation (IDCT) and motion vector using motion compensation process. In this instance, all data input/output from/to the external memory 20 and the MPEG decoder 10 are conducted under the control of the memory controlling part 12. The external memory 20 is required for writing and reading of the bit stream for variable length decoding, data reading for motion compensation, and writing a decoded data and reading a data to be displayed, and because an order (I, P, B, B) of pictures to be decoded and an order (I, B, B, P) of pictures to be displayed are different. The image presenting part 14 reads the pixel data of a picture, decoded in the video decoding part 13 and stored in the external memory 20, in an order of display, processes signals to be displayable on a screen (step 203), converts a video format if the video source and display 30 are different in numbers of display pixels, data transmission rates, or aspect ratios, and presents to the display 30. That is, the image presenting part 14 determines a display size and a video source size of being different from each other after processing the signal (step 204). The size herein may denote a number of pixels, an aspect ratio of the image, or a data transmission rate, called a frame rate. It the display size and the source size are determined to be identical in the step 204, the data signal processed are presented to, and displayed on the display 30 without any conversion of video format (step 205). On the other hand, if determined different in the step 204, the display size is compared to the video source size whether the display size is greater or smaller than the video source size (step 206). If it is determined that the display size is greater than the video source size in the step 206, for example, the display has an aspect ratio of 16:9 while the video source has an aspect ratio of 4:3, or the display is an HD class while the video source is an SD class, the decoded I, P, B pictures are subjected to operations such as pixel interpolations respectively and present to the display 30 (step 207). If determined that the display size is smaller than the video source size in the step 206, that is, it is opposite to the step 207, the decoded I, P, B pictures are subjected to data reduction operations such as pixel filtering respectively and present to the display 30 (step 208). As there are many known video format converting techniques, some of the techniques may be used.

Figure 3:
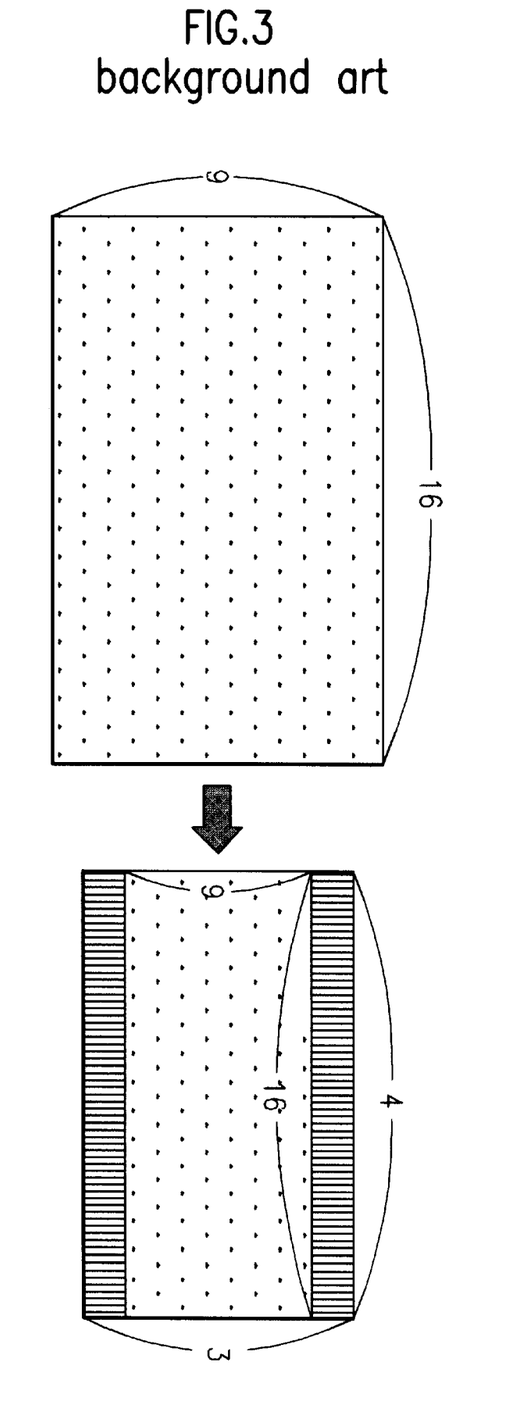
FIG. 3 illustrates one of methods for converting a video signal with a 16:9 aspect ratio to a video signal with a 4:3 aspect ratio.

FIG. 3 illustrates one of the video format converting technique, wherein a letter box processing is made, in which a video signal with a 16:9 aspect ratio is converted into a video signal with 4:3 aspect ratio. In the method of converting a video signal with a 16:9 aspect ratio is converted into a video signal with 4:3 aspect ratio, there are, other than the letter box processing, the pan scan method in which opposite sides of a decoded data are cut away to make an aspect ratio of 4:3 or a method in which a 16:9 image is compressed in a horizontal direction to convert it into an aspect ratio of 4:3.

Figure 4:
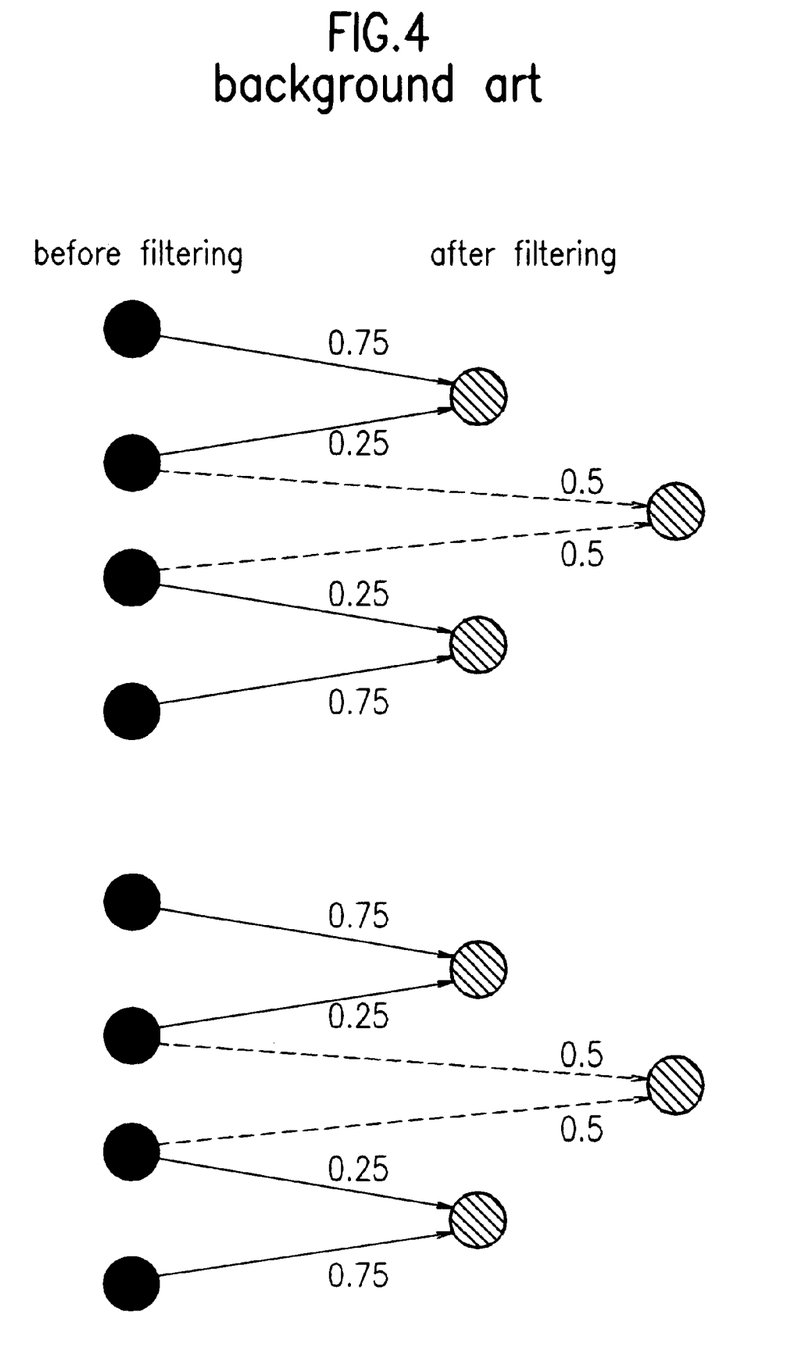
FIG. 4 illustrates one example of a letter box filtering process for conducting the method of FIG. 3.

FIG. 4 illustrates an example of a letter box filtering for preventing an image from being distorted when an image of 16:9 aspect ratio is displayed on a TV of 4:3 aspect ratio, in which 3 scan lines are presented per every 4 samples. That is, in the letter box filtering, an upper and a lower pixels in a frame is interpolated to adjust a number of the pixels;

pixels in a vertical direction in a frame are interpolated, to call it as a vertical filtering. This vertical filtering leads a number of pixels reduced to ¾ compared to a number of pixels in a frame of an original image. Therefore, in the case of letter box processing, a rate of data transmitted from the image presenting part 14 to the display 30 is reduced to ¾ compared to a rate of data transmitted from the video decoding part 13 to the image presenting part 14 through the external memory 30. In this instance, the filtering coefficients shown in FIG. 4 may be different depending on methods of implementation. Thus, in the background art, a video format conversion, like the letter box processing, is conducted in the image presenting part 14, i.e., a device which displays an image restored into an original state as the decoding finished.

Accordingly, the background art MPEG decoder has the following problems.

First, since a video format conversion, like the letter box processing, is conducted in the image presenting part, which is a final step in the MPEG decoder, the rate of data transmission up to this step has been exceedingly great compared to a rate of data presented finally, particularly, such a drawback is significant in a B-picture which has a great rate of motion compensation data transmission. That is, though an I or P picture demands a small size of memory bandwidth, which represents a data transmission rate, a B-picture demands a great size of memory bandwidth because the B-picture requires data on both forward and backward pictures for a motion compensation. Because a number of memory ports is limited, that is one possibility of solving this problem, a clock frequency should be increased, that makes implementation difficult and costs high.

Second, in the case of restored B-picture image stored in the external memory, though an amount of data actually presented to the display is no more than ¾ of the pixels stored in the memory, because all the data is stored in the external memory, with an increased memory bandwidth, an efficiency of a memory use is low.

Third, for reducing a data transmission rate in the case of a transmission rate increase of memory data, like the case of a B-picture processing, as the image presenting part reads a pixel data of one scanning line as a basic unit and subject the pixel data to a letter box processing, a separate buffer for storing the read pixel data is required to use, which results in an increase of a size of the MPEG decoder.

SUMMARY OF THE INVENTION

Accordingly, the present invention is directed to device and method for processing a picture in an MPEG decoder that substantially obviates one or more of the problems due to limitations and disadvantages of the related art.

An object of the present invention is to provide device and method for processing a picture in an MPEG decoder which can reduce an amount of data to be stored in an external memory for reducing a memory size and a bandwidth.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for processing a picture in an MPEG decoder includes the steps of (1) reading and decoding a bit stream stored in an external memory by means of the video decoding part, (2) comparing a display size to a video source size using a result of decoding in the step (1), (3) subjecting a data decoded in the step (1) to a video format conversion to reduce a number of pixels and storing the pixels in the external memory if it is determined in the step (2) that the display size is smaller than the video source size, and (4) reading a pixel data stored in the external memory in the step (3) and processing, and presenting the pixel data so as to be displayable on a screen.

The sizes in the step (2) represents a number of pixels, aspect ratios, or data transmission rates.

In the step (3), only decoded B pictures are subjected to video format conversions and stored in the external memory.

Decoded I/P pictures are stored in the external memory as they are without subjecting to any video format conversion in the step (3) so that the I/P pictures stored in the external memory are read and subjected to a video format conversion by the image presenting part.

In other aspect of the present invention, there is provided a device for processing a picture in an MPEG decoder including a video decoding part having a video format converting part for subjecting a pixel data of a decoded picture to a video format conversion so as to be in agreement to a display size.

The video format converting part conducts the video format conversion only for decoded B pictures.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 5:
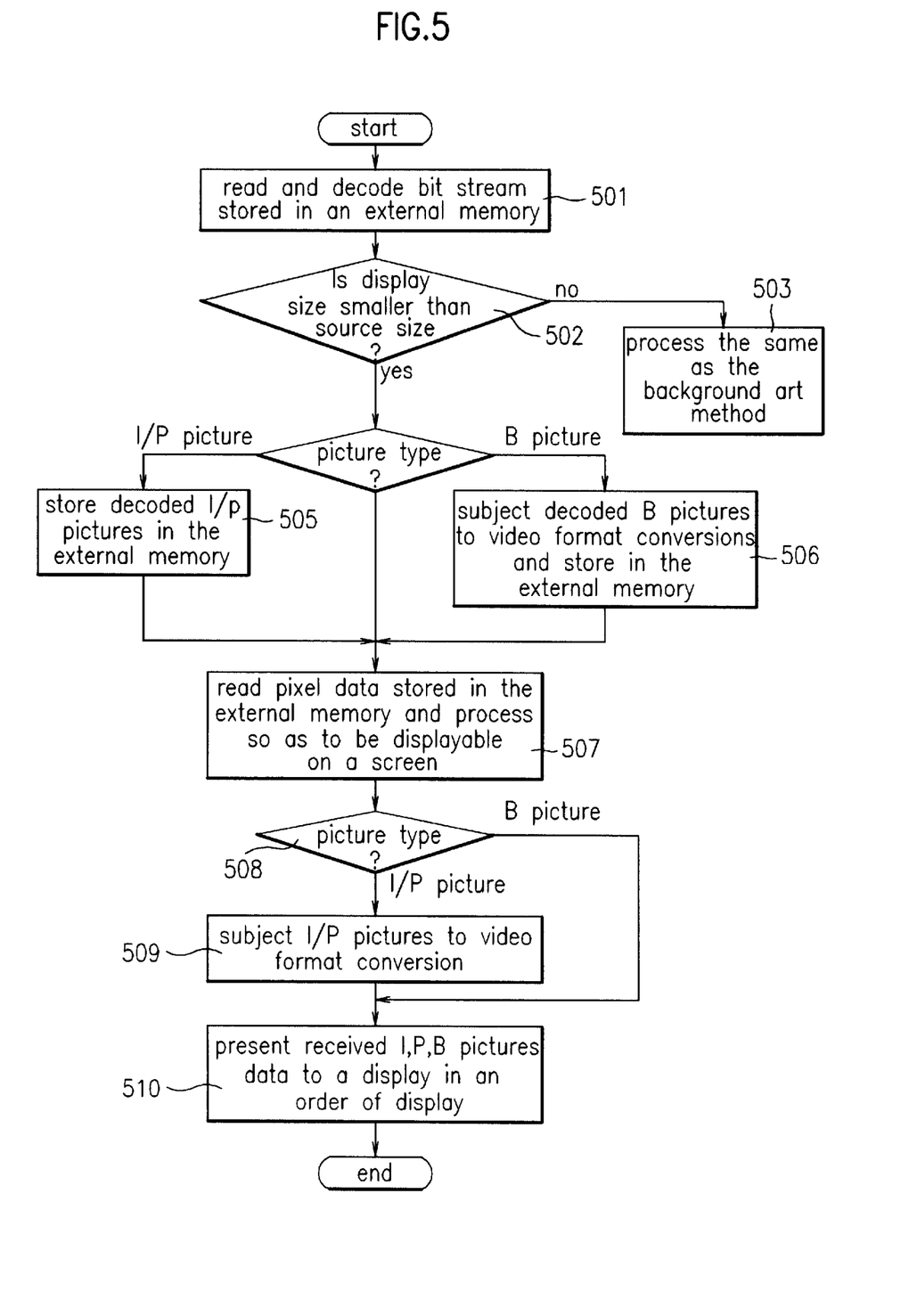
FIG. 5 illustrates a operation flow chart showing a method for processing a picture in an MPEG decoder in accordance with one preferred embodiment of the present invention; and, FIG. 6 illustrates a block diagram of a system of an MPEG decoder of the present invention.

Reference will now be made in detail to the preferred embodiments of the present invention, examples of which are illustrated in the accompanying drawings. FIG. 5 illustrates a operation flow chart showing a method for processing a picture in an MPEG decoder in accordance with one preferred embodiment of the present invention, and FIG. 6 illustrates a block diagram of a system of an MPEG decoder of the present invention.

Figure 6:
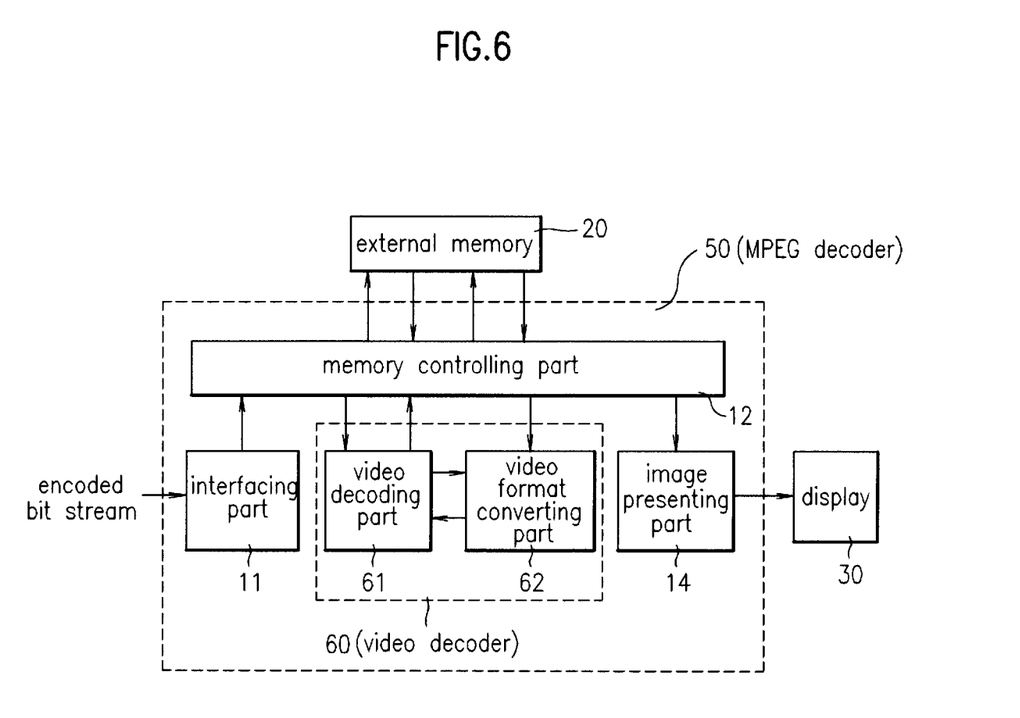

Referring to FIG. 6, a video format converting part 62 for converting a video format so to be in agreement with a display size is added to an existing video decoding part 61, to form a video decoder 60 of the present invention, in which a video format conversion, like the letter box processing carried out in the video presenting part 14 in the case of background art, is carried out in the video decoder 60 in a process of video decoding. The present invention is particularly effective in a case of video format conversion, in which a reduction of number of pixels from a number of original pixels is required, i.e., in a case of video format conversion requiring a data reduction, such as a video format conversion from an HD class video to an SD class video, or from an image with a 16:9 aspect ratio to an image of a 4:3 aspect ratio. In this instance, as the I-picture and the P-picture are used as reference pictures, reference data, for conducting motion compensation in a decoding operation of an MPEG image, the I- and P-pictures can not be used as reference data for conducting the motion compensation because the subjection of the I- and P-pictures to a video format conversion in a decoding process, resulting in reductions of pixel numbers, not only makes an image different from an original image, but also degrades a picture quality too much. Therefore, in the preferred embodiment of the present invention, only the B-picture, of the pixel data (I-picture, B-picture, P-picture) to be decoded, is subjected to video format conversion in the video format converting part 62, while the I-, and P-pictures are subjected to video format conversion in the image presenting part 14 as in the background art. Then, because the image presenting part 14 is not required to conduct a video format conversion of the B-picture which requires the greatest amounts of operation and transmission, no performance degradation will occur and no hardware for compensating this degradation will be required, reducing a complexity of entire hardware. Since the video decoder 60 is a device for conducting a decoding operation by a macro block unit, the video decoder 60 is suitable for the aforementioned video format conversion, for example, the letter box filtering more than the image presenting part 14. That is, with regard to macro blocks, a square of N*N pixels (in general 16*16) is a basic unit of operation. And, during a decoding operation, operation is conducted by a macro block unit having N pixels both in horizontal and vertical directions, which is therefore configuration very much suitable to a video format conversion, such as the letter box processing in which 4 pixels in a vertical direction are subjected to interpolation. On the contrary, since the image presenting part 14 has a system in which data is processed by a scan line unit, either an internal buffer is required or a memory data transmission rate should be increased, for carrying out the vertical filtering. That is, in a device which processes by a scan line unit, like the image presenting part 14, the video format conversion may be a cause of a hardware increase, but the video format conversion can be implemented by means of the video decoder 60 with easy. Accordingly, there are less parts additionally required compared to the parts required for conducting a video format conversion in the background art video image presenting part 14.

Steps of a method for processing a picture in an MPEG decoder of the present invention for doing this will be explained with reference to FIGS. 5 and 6.

Upon reception of an encoded bit stream, the bit stream is stored in an external memory 20 through an interfacing part 11. Then, the video decoding part 61 in the video decoder 60 reads in and decodes a bit stream from the external memory 20 (step 501), and compares a size of a decoded pixel data to a display size (step 502). That is, when a compressed bit stream is decoded, information on a source size transmitted from a transmission side can be known. The size herein may be a number of pixels, an aspect ratio, or a data transmission rate called a frame rate. In the present invention, explanation is given based on a frame rate. If it is found that the display size is equal or greater than the source size (for example, in the case when a video of an SD class is converted into a video of an HD class) in the step 502, since the present invention provides no significant advantage, the data is processed in a method identical to the background art (step 503). On the other hand, if it is determined that the display size is smaller than the source size in the step 502, then a picture type is determined (step 504). If it is determined that the picture is either I or P picture in the step 504, the decoded I/P picture is stored in the external memory as it is (step 505), and if determined to be a B picture, the B picture is subjected to a video format conversion in the video format converting part 62 and stored in the external memory 20 (step 506). For example, if a video source with a 16:9 aspect ratio is subjected to a letter box processing for reproducing on a TV with a screen of a 4:3 aspect ratio, only the B-picture, of the pixel data, is subjected to the letter box processing in the video format converting part 62 and stored in the external memory 20. In this instance, since the B-picture subjected to the letter box processing is involved in reduction of it data amount to ¾, a data amount stored in the external memory 20 is reduced as much. And, of the pixel data, because the pixel data that requires the greatest amount of data transmission is the B-picture, conducting the letter box processing only on the B-picture can reduce a substantial amount of data transmission, with which, not only a memory size, but also a memory band width can be reduced. In other words, a memory size reduction allows a cost reduction and a memory bandwidth reduction, with consequential allowance of use of a slow clock, further reduce a cost. When the decoded I and P pictures and the decoded and letter box processed B picture in the aforementioned steps are stored in the external memory 20, the image presenting part 14 reads the pixel data of a picture stored in the external memory 20 in a sequence of display, processes the pixel data so as to be displayable on a screen (step 507), and determines of what is the picture read from the external memory 20 at the present time (step 508) because only the B picture is subjected to a letter box processing in the video decoder 60, but not the I and P pictures. Therefore, if the picture is determined to be either I or P picture in the step 508, the I or P picture are subjected to a video format conversion i.e., a letter box filtering and presented to the display 30, if the picture is determined to be a B picture, the B picture is present to the display 30 without any further letter box filtering. That is, the amount of data of a B picture after being subjected to a letter box processing in the video decoder 60 is reduced to ¾ of the B picture data before received at the video decoder 60, and the data, of which amount thus reduced, is displayed on the display 30 through the external memory 20 and the image presenting part 14. Therefore, amounts of data transmission, i.e., memory bandwidths between the video decoder 60 and the external memory 20 and between the external memory 20 and the image presenting part 14 can be reduced.

The aforementioned method for processing a picture in an MPEG decoder of the present invention has the following advantages.

First, of the video format conversions carried out in the image presenting part, by processing the video format conversion requiring a data reduction such as the letter box processing during a video decoding process by the video decoder in advance, reducing amounts of data transmissions between the video decoder and the external memory and between the external memory and the image presenting part, the present invention can reduce not only an external memory size, but also a memory bandwidth, whereby improving an efficiency of use of the memory.

Second, on top of the fact that a memory size reduction lowers cost, the memory bandwidth reduction can further lower cost because a slower clock can be used.

Third, the conduction of video format conversion which requires a data reduction by the video decoder which decodes by a macro block unit allows a simple circuitry system in comparison to the image presenting part which requires an internal buffer, with a reduction of a volume, whereby allowing a low cost, compact product.

It will be apparent to those skilled in the art that various modifications and variations can be made in the method and device for precessing a picture in an MPEG decoder of the present invention without departing from the spirit or scope of the invention. Thus, it is intended that the present invention cover the modifications and variations of this invention provided they come within the scope of the appended claims and their equivalents.

What is claimed is:

1. A method for processing a picture in an MPEG decoder, the MPEG decoder having a video decoding part, an image presenting part and an external memory, the method comprising the steps of:

(1) reading and decoding a bit stream stored in the external memory using the video decoding part;
    (2) comparing a display size to a video source size using a result of decoding in the step (1);
    (3) subjecting a data decoded in the step (1) to a video format conversion based on a picture type to reduce a number of pixels and storing the converted reduced pixels in the external memory if it is determined in the step (2) that the display size is smaller than the video source size; and
    (4) reading the converted reduced pixel data stored in the external memory in the step (3) and the displaying the converted reduced pixel data on a display.

2. A method as claimed in claim 1, wherein the sizes in the step (2) denote aspect ratios.

3. A method as claimed in claim 1, wherein the sizes in the step (2) denote numbers of pixels.

4. A method as claimed in claim 1, wherein the sizes in the step (2) denote data transmission rates.

5. A method as claimed in claim 1, wherein only a decoded B picture is subject to the video format conversion, to reduce the number of pixels in the step (3).

6. A method as claimed in claim 1, wherein decoded I/P pictures are stored in the external memory as they are without any video format conversion in the step (3) so that the I/P pictures stored in the external memory are read and subjected to a video format conversion by the image presenting part.

7. A method as claimed in claim 1, wherein the video format conversion is conducted by a macro block unit in the step (3).

8. A method as claimed in claim 1, wherein the video format conversion is conducted by means of a letter box filtering in the step (3).

9. A video decoder, comprising:

an external memory;
    a video decoder to decode a received bit stream and store the decoded bit stream in the external memory;
    a video format converter, coupled to the video decoder to receive and format B type pixel data of the decoded bit stream before being stored in the external memory; and
    an image presenting part coupled to read decoded pixel data in the external memory, process the decoded pixel data so as to be displayable on a screen, and present the pixel data to a display.

10. The device as claimed in claim 9, wherein the video format converter conducts the video format conversion only when a display size is smaller than a video source size.

11. The device as claimed in claim 9, wherein the video format converter conducts the video format conversion only for B pictures, to reduce a number of pixels, to match a display size.

12. A method for processing a picture in an MPEG decoder, the MPEG decoder having a video decoding part, an image presenting part and an external memory, comprising the steps of:

(1) reading and decoding a bit stream stored in the external memory using the video decoding part;
    (2) comparing a display size to a video source size using a result of decoding in the step (1);
    (3) subjecting a data decoded in the step (1) to a video format conversion to reduce a number of pixels in a B-type picture and storing the converted reduced pixels in the external memory if it is determined in the step (2) that the display size is smaller than the video source size;
    (4) storing pixels of the data decoded in step (1) in a I-type picture and a P-type picture without format conversion;
    (5) reading the converted reduced pixel data stored in the external memory in the step (3) and displaying the converted reduced pixel data on a display;
    (6) subjecting the I-type and P-type pictures to video format conversion; and
    (7) displaying the converted reduced I-type, P-type and B-type pictures on a display.

13. A method for processing a picture in an MPEG decoder, the MPEG decoder having a video decoding part, an image presenting part and an external memory, comprising:

(1) reading and decoding a bit stream stored in the external memory using the video decoding part to generate a decoded picture;
    (2) converting a format of the decoded picture and storing the converted picture in the external memory, or storing the decoded picture in the external memory without a format conversion, according to a type of the decoded picture;
    (3) reading a pixel data stored in the external memory, and processing and presenting the pixel data so as to be displayable on a screen, wherein B type pictures are converted and stored in the external memory, and I/P type pictures are stored in the external memory without the format conversion.

14. A method for processing a picture in an MPEG decoder, the MPEG decoder having a video decoding part, an image presenting part and an external memory, comprising:
  (1) reading and decoding a bit stream stored in the external memory using the video decoding part to generate a decoded picture;
  (2) converting a format of the decoded picture and storing the converted picture in the external memory, or storing the decoded picture in the external memory without a format conversion, according to a type of the decoded picture;
  (3) reading a pixel data stored in the external memory, and processing and presenting the pixel data so as to be displayable on a screen, wherein if the pixel data stored in the external memory is an I or P picture, the data is subjected to a video format conversion and presented to the display, and if the pixel data is a B picture, the data is presented directly to the display with no further processing.

15. An MPEG decoder, comprising;

an external memory;

a video decoding part for decoding a received bit stream and storing in the external memory; and an image presenting part for reading a decoded pixel data in the external memory, processing the pixel data so as to be displayable on a screen, and presenting the pixel data to a display, wherein the video decoding part further comprises a video format converting part for converting a format of pixel data of a decoded picture which is subject to a video format conversion, wherein B type pictures are processed in the video format converting part prior to storage in the external memory and I/P type pictures are stored directly in the external memory.

* * * * *